Jan. 29, 1957
T. F. SMITH
2,779,237
OUTDOOR DRIVE-IN THEATRE AND PROJECTION MEANS
WITH A PLURALITY OF VIEWING SCREENS
Filed Sept. 17, 1954
2 Sheets-Sheet 1
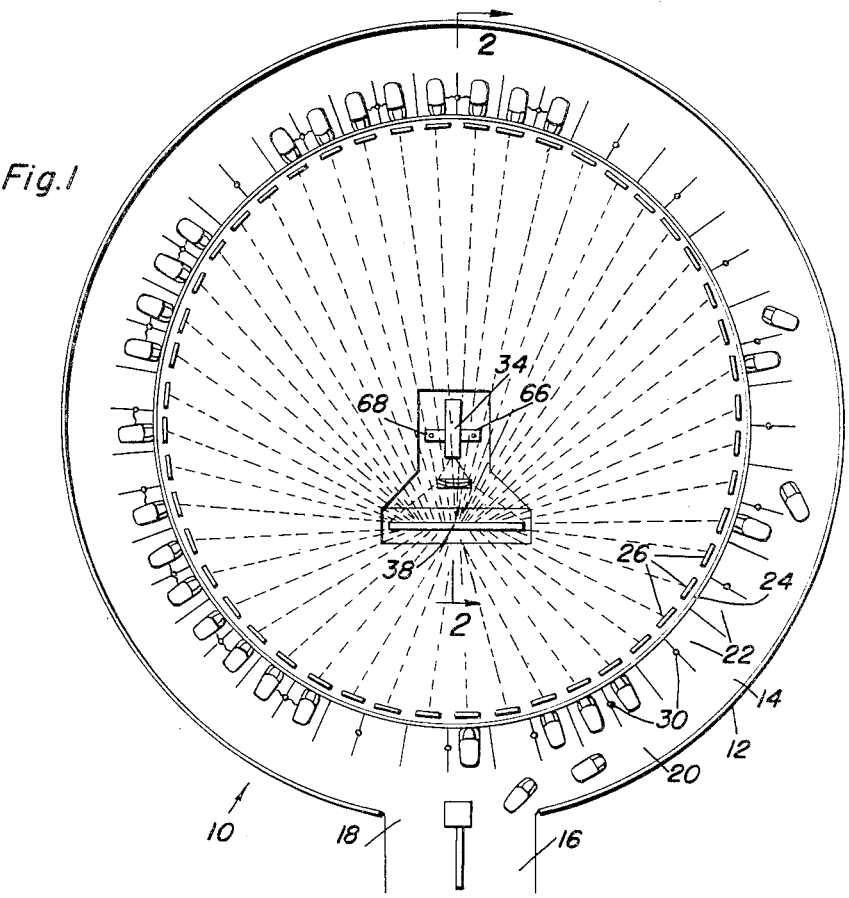
Tom F. Smith
INVENTOR.
BY
Attorneys Jan. 29, 1957 T. F. SMITH 2,779,237
OUTDOOR DRIVE-IN THEATRE AND PROJECTION MEANS
WITH A PLURALITY OF VIEWING SCREENS
Filed Sept. 17, 1954 2 Sheets-Sheet 2
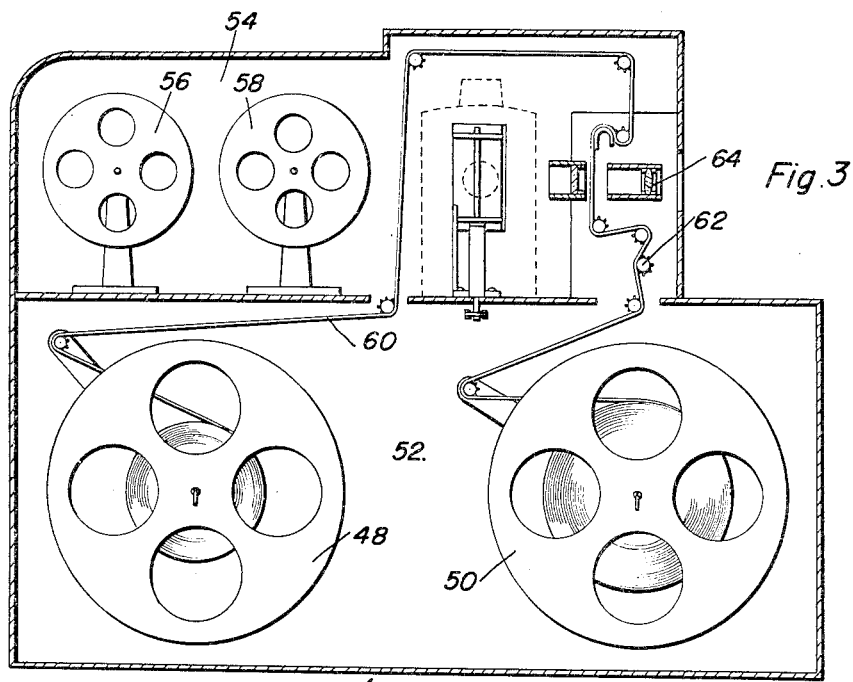
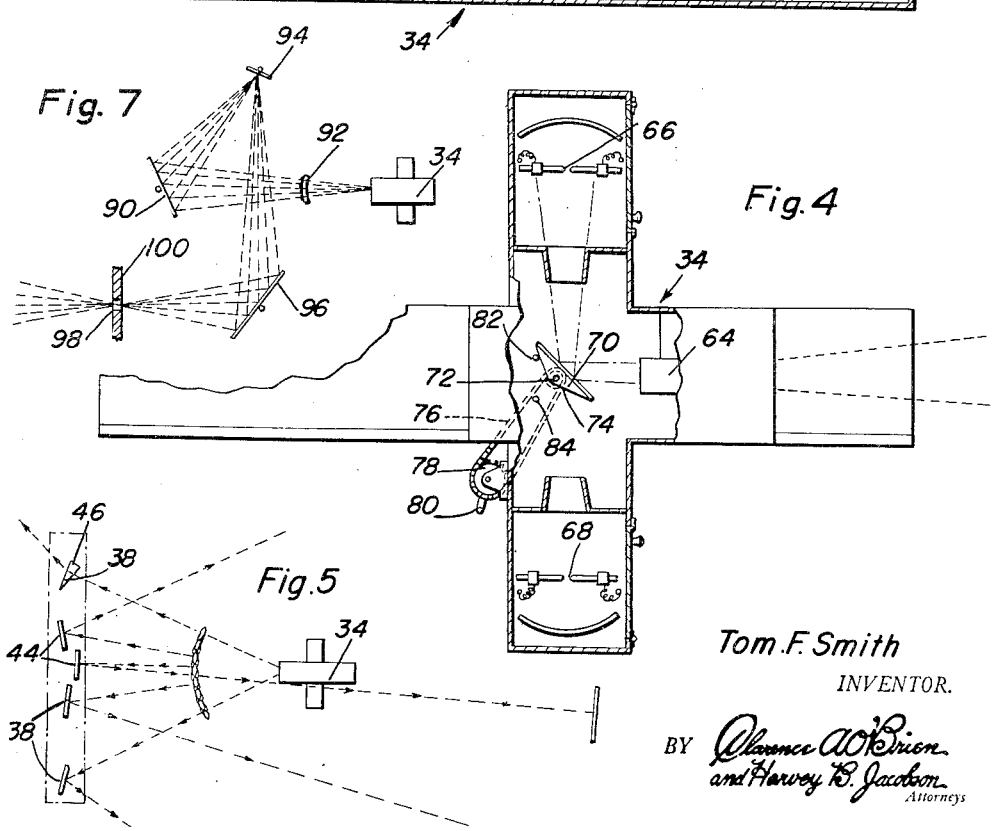
Tom F. Smith
INVENTOR.
BY Clarence A. O'Brien
and Harvey B. Jacobson
Attorneys United States Patent Office 2,779,237
Patented Jan. 29, 1957

2,779,237

OUTDOOR DRIVE-IN THEATRE AND PROJECTION MEANS WITH A PLURALITY OF VIEWING SCREENS

Tom F. Smith, Urbana, Mo., assignor to Autoscope, Inc., Urbana, Mo., a corporation of Missouri Application September 17, 1954, Serial No. 456,757

2 Claims. (Cl. 88—24)

This invention relates to a drive-in theatre provided with individual car screens and having a novel projecting apparatus and is a continuation-in-part of the application of Tom F. Smith, Serial No. 321,005, filed November 17, 1952, now Patent No. 2,734,420, issued February 14, 1956, for Drive-In Theatre With Individual Car Screens.

The primary object of the present invention resides in the provision of means for economically and efficiently providing in each of a plurality of individual viewing screens a picture of optimum clarity and intensity of illumination thus making attendance at an outdoor or drive-in theatre equally enjoyable by all patrons independent of the location where they are situated thus not only eliminating the continuous movement of vehicles as in drive-in theatres but preventing the obstruction of the single over-sized screen usually provided in drive-in theatres by one vehicle with respect to another.

Another object of the invention resides in the provision of a projector which includes reels having capacity for a complete feature motion picture film and which includes novel light cylinders which are selectively successively utilized to provide the source of illumination for the projector.

Still another object of the invention resides in the provision of a drive-in theatre arrangement wherein a single projector can be utilized to provide a continuous performance and which utilizes separate sources of illumination which may be utilized selectively and successively to thereby permit a continuous showing of a feature film from the single projector.

These, together with the various ancillary objects and features of the invention which will become apparent as the following description proceeds, are attained by this novel drive-in theatre with individual car screens, a preferred embodiment of which has been illustrated in the accompanying drawings, by way of example only, wherein:

Figure 1 is a top plan view diagrammatically indicating a suitable embodiment of theatre construction especially adapted for use at a drive-in or outdoor theatre whereby an individual screen is provided at a number of stations and energized by a single projector with the individual screens being disposed at angular intervals surrounding the projector;

Figure 2 is a vertical longitudinal sectional view taken substantially along the plane of line 2—2 in Figure 1 and illustrating the arrangement of the projector, lens assembly and the viewing screen;

Figure 3 is an enlarged sectional detail view illustrating the internal arrangement of the projector;

Figure 4 is a sectional detail view illustrating the means utilized for shifting from one arc lamp to the next successive arc lamp to be utilized;

Figure 5 is a diagrammatic view illustrating the relative arrangement of the projector, lens assembly and the assembly of light directing elements:

Figure 6 is a partial elevational view of the lens assembly forming a part of the invention; and Figure 7 is a diagrammatic view illustrating a projecting and reflecting arrangement.

With continuing reference to the accompanying drawings wherein like reference numerals designate similar parts throughout the various views, and with initial attention to Figures 1 and 2 it will be seen that herein there is disclosed a drive-in theatre generally designated by reference numeral 10 which is adapted for various other purposes and which preferably includes an enclosing wall 12 surrounding a level plot or floor 14.

An entrance way 16 is provided for the drive-in theatre 10 whereby vehicles or persons may enter the enclosure and an exit 18 is likewise provided for means whereby a patron may leave the theatre. In communication with the entrance 16 and exit 18 and immediately adjacent the inside of the closure wall 12 there is provided a passage way 20 whereby persons or vehicles may move about the enclosure to selected viewing stations 22. These stations 22 may be of any convenient size so as to accommodate a single automotive vehicle or a plurality of vehicles as may be desired and are disposed radially about the center of the circular enclosure and at substantially equal angular intervals about the center thereof.

A low wall or protective barricade 24 which may be also circular in configuration is disposed radially inwardly of the passageway 20 and constitute the inner wall for the stations 22. Disposed inwardly of each of the viewing stations 22 is an individual screen as at 26 carried by a suitable framework 28. The screen is preferably of a suitable translucent material so that an image imposed thereon from a light beam from the interior of the circular screen will pass through the screen and be visible to the patrons in the various viewing stations 22. Loud speakers 30 may be provided adjacent each of the various viewing stations 22.

Substantially centrally located within the drive-in theatre 10 there is provided a single projecting station wherein one propector may be provided for energizing each of the viewing screens simultaneously. The projector station consists of a chamber or a recess 32 disposed substantially centrally of the circular enclosing wall 12 and having a projector 34 disposed therein below the level of the ground or floor 14. By thus recessing the projector 34 below the ground, the rays from the projector may be directed upwardly and outwardly from the recess and thus may travel or be directed throughout the 360° or that portion occupied by the viewing stations 22.

In order to permit the single projector 34 to activate each of the screens there is provided as can be most clearly seen in Figures 2, 5 and 6 a multiple lens assembly 36 together with an assembly of light directing elements 38 identical with the arrangement previously disclosed in the co-pending application of Tom F. Smith, Serial No. 321,005. The multiple lens assembly 36 is interposed between the projector and the light directing elements 38 which is interposed between the lens assembly 36 and the individual screens 26.

As can be seen best in Figure 6, the lens assembly 36 includes a plurality of individual lenses 40. Each of the lenses 40 breaks up the beam of light from the projector 34 into a plurality of beams, and each of these divided beams are in turn directed to one of the light directing elements 38. The light directing elements 38 may consist of reflecting mirrors 44 where it is desired to reflect the beams from the lenses, prisms 46, where it is merely desired to reflect the beams, or in some instances simple lenses may be employed where it is desired merely to focus the beams. Each of the light directing elements 38 is so arranged as to cause a beam from one of the lenses 42 to be directed to and impinge upon the face of the screen 26. Thus the beam directed from the projector 34 divided into a plurality of rays or beams, each of which is, in turn, directed to one of the screens. Obviously, the positioning and characteristics of the lenses 42 and of the light directing elements 38 may be appropriately chosen to cause an image of the same size to be projected on each of the screens 28.

Referring now more particularly to Figures 3 and 4 it will be noted there the projector 34 is more specifically disclosed. The projector 34 includes suitable reels 48 and 50 which are mounted in a lower compartment 52 of the projector 34. In the upper compartment 54 of the projector other reels 56 and 58 are mounted. The reels 48 and 50 are of sufficient size to have wound thereon a feature film of a duration of two hours and forty minutes for normal viewing speed. The reels 48 and 50 may be of approximately four feet in diameter and therefore the individual motion picture films may have the various reels thereof spliced together before winding on the reels 48 and 50. On the reels 56 and 58 which are considerably smaller than the reels 48 and 50 there may be wound short subjects. It is noted that the film 60 wound on the wheels 48 and 50 are entrained about a suitable driving arrangement 62 of any convenient and conventional nature and are directed through a conventional lens arrangement 64. However, in order to provide a source of illumination for the projector 34 there are provided a pair of arc lamps 66 and 68 which are arranged on opposite sides of the projector 34. Mounted in the projector 34 and centrally between the arc lamps 66 and 68 is a mirror 70 which is rotatably mounted on a shaft or pin 72. Rigidly connected to the shaft 72 to which the mirror 70 is attached is a sprocket wheel 74 about which a chain 76 is engaged, the chain being entrained about a sprocket wheel 78 driven by a handle 80. Hence, upon rotation of the handle 80, the sprocket wheel 78 will cause the chain 76 to drive the sprocket wheel 72 and hence the shaft and thus the mirror 70 from one stop 82 to the other stop 84 to thus change the angular position of the mirror 70 with respect to the arc lamps 66 and 68. With the mirror 70 directed at a 45° angle with respect to the arc lamp 66, the light emanating from the arc light 66 will then be directed through the projector. Obviously when rotated into engagement with the stop 84, the mirror 70 will be at a 45° angle with respect to the arc lamp 68 and will thus direct the light rays through the projector lens 64. It is to be recognized that various other angular arrangements of parts may be utilized as may be desired. Hence, since the arc lamp 66 and 68 have only approximately a half hour life, when one of these arc lamps is adjusted or replaced, the other of the arc lamps may be utilized. The mirror 70 may be rotated almost instantaneously from one position to another and may be so done during a fade out sequence of the motion picture being shown. Hence, using only the single projector an entire feature film may be visually displayed on the individual car theater screens 36. Further, the period between the showing of the main feature wound on the reels 48 and 50 and the short subjects wound on the reels 56 and 58 may be utilized by the theatre management in providing refreshments for the patrons or to permit the individual patrons to enter or depart during such intermission.

In Figure 7 there is shown a novel arrangement for projecting and reflecting the picture image which can be readily incorporated into the invention. This includes a converging reflector 90 onto which the image is projected through lens 92 and this converging reflector 90 directs a focused image onto a reflector 94 in a beam extending normal to the initially projected beam but vertically offset therefrom. The focus image is reflected by reflector 94 onto reflector 96 and then focused through the porthole 98 of baffle 100 so that the image can subsequently be projected on a screen.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A theatre comprising a substantially circular plot of ground, a projector recess in said plot of ground, a projector mounted underground in said recess, a pair of arc lamps forming light sources arranged in said recess on the opposite sides of said projector, a plurality of viewing screens arranged circularly about said projector, adjustable means for selectively directing the light rays emitted by one of said arc lamps into and through said projector with said projector directing light rays upwardly and outwardly of said recess, and means for simultaneously producing visible images upon said screens including a lens assembly interposed between said projector and said screens.

2. A theatre comprising a substantially circular plot of ground, a projector recess in said plot of ground, a projector mounted underground in said recess, a pair of arc lamps forming light sources arranged in said recess on the opposite sides of said projector, a plurality of viewing screens arranged circularly about said projector, adjustable means for selectively directing the light rays emitted by one of said arc lamps into and through said projector with said projector directing light rays upwardly and outwardly of said recess, and means for simultaneously producing visible images upon said screens including a lens assembly interposed between said projector and said screens, an assembly of light directing elements interposed between said lens assembly and said screens, each lens of said lens assembly directing a beam of light to a light directing element, each light directing element directing said beam of light to one of said screens, said adjustable means including a pivotally mounted mirror and means for rotating said mirror to a position whereby said mirror reflects light rays emitted by said arc lamps through said projector.

References Cited in the file of this patent

UNITED STATES PATENTS

| | | |
|---|---|---|
| 1,666,304 | Proctor | Apr. 17, 1928 |
| 1,887,650 | Larner et al. | Nov. 15, 1932 |
| 1,931,668 | Maurer | Oct. 24, 1933 |
| 1,940,148 | Scott | Dec. 19, 1933 |
| 2,031,361 | Bowen | Feb. 18, 1936 |
| 2,041,194 | Lindenberg | May 19, 1936 |
| 2,041,195 | Lindenberg et al. | May 19, 1936 |
| 2,045,093 | Newcomer | June 23, 1936 |
| 2,373,013 | Clark et al. | Apr. 3, 1945 |

FOREIGN PATENTS

| | | |
|---|---|---|
| 93,077 | Austria | June 11, 1923 |
| 99,122 | Austria | June 26, 1925 |